June 5, 1956  C. N. STONE  2,748,682
HITCH DEVICE

Filed June 17, 1952  2 Sheets-Sheet 1

INVENTOR.
CHARLES N. STONE
BY
ATTORNEYS

June 5, 1956  C. N. STONE  2,748,682
HITCH DEVICE

Filed June 17, 1952  2 Sheets-Sheet 2

INVENTOR.
CHARLES N. STONE
BY
ATTORNEYS

United States Patent Office 2,748,682
Patented June 5, 1956

2,748,682

HITCH DEVICE

Charles N. Stone, Moline, Ill., assignor to Deere & Company, Moline, Ill., a corporation of Illinois Application June 17, 1952, Serial No. 293,956

5 Claims. (Cl. 97—47.52)

The present invention relates generally to agricultural implements and more particularly to hitch devices for connecting earth-working implements to a propelling tractor or the like.

The object and general nature of the present invention is the provision of a new and improved hitch device which incorporates means whereby, when the implement is raised, the implement is also shifted forwardly relative to the tractor, whereby the latter is relieved of excessive loads and stresses normally imposed on the tractor when an implement is raised into a transport position and supported substantially entirely on the rear end of the tractor. More particularly, it is a feature of this invention to provide means in the nature of telescoping links so constructed and arranged that when the implement is raised the weight of the implement causes it to shift forwardly toward the rear end of the tractor and to occupy a position closely adjacent the tractor so as to reduce as far as possible the overhang of the implement when transporting it from one place to another.

These and other objects and advantages of the present invention will be apparent to those skilled in the art after a consideration of the following detailed description, taken in conjunction with the accompanying drawings, in which.

Figure 1:
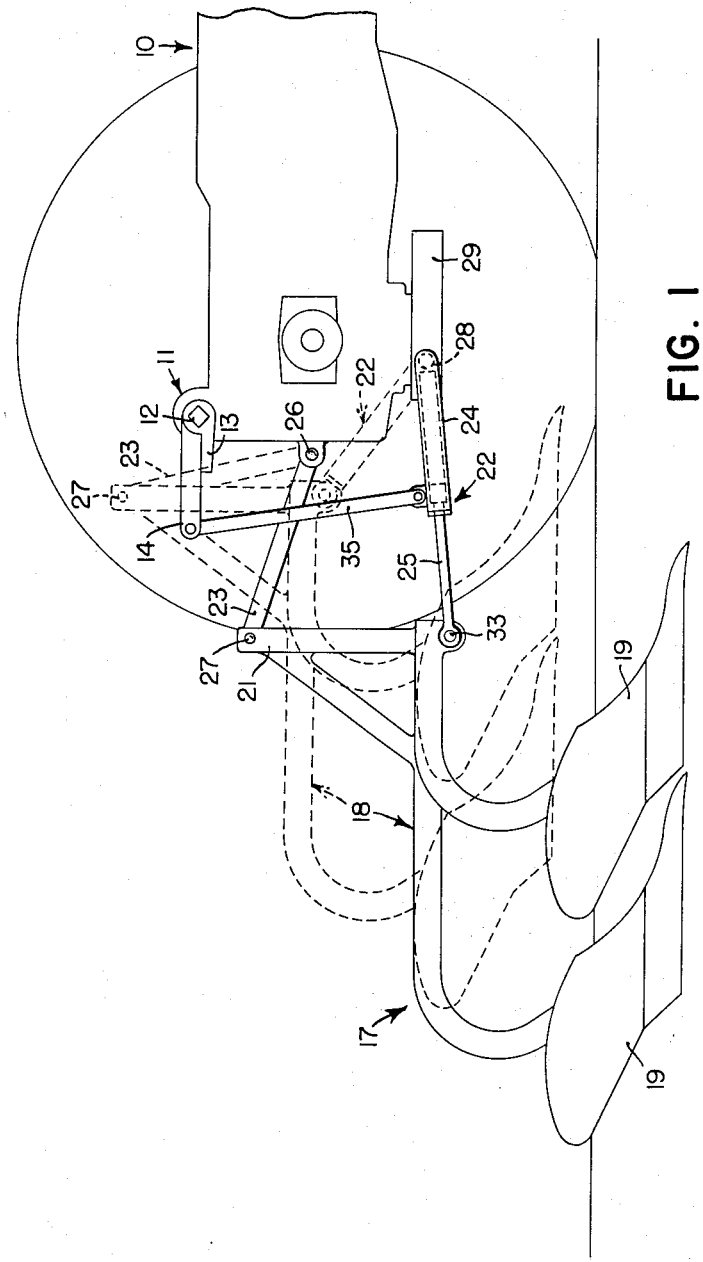
Figure 1 is a side view of a hitch device in which the principles of the present invention have been incorporated, together with portions of the rear end of the propelling tractor and the forward end of the associated implement. The raised position of the implement is shown in dotted lines.

Referring first to Figure 1, the reference numeral 10 indicates a farm tractor, which is more or less conventional so far as the present invention is concerned. The tractor 10 includes a power lift mechanism 11, and the latter includes a rockshaft 12. Secured to opposite ends of the rockshaft 12 is a pair of lift members 13 having portions disposed underneath a pair of lift arms 14, the forward portions of the arms being rockably connected with the rockshaft 12. A one-way connection is thus established between the lift members 13 and the lift arms 14 whereby the power lift mechanism of the tractor may be utilized to raise the arms 14, but, where necessary, as when passing over uneven ground, the arms 14, or either of them, may swing upwardly relative to the power lift actuated lift members 13.

The implement which has been chosen to illustrate the principles of the present invention is indicated in its entirety by the reference numeral 17 and, for purposes of illustration, is shown as a two-bottom mold-board plow which includes a frame 18 and plow bottoms 19. The forward portion of the frame 18 includes a generally vertically extending mast section 21.

According to the principles of the present invention, the implement 17 is connected with the tractor through a pair of lower link members 22 and an upper link member 23, each of the lower link members including telescopically associated parts 24 and 25. The upper link member 23 is connected at its forward end, by any suitable means, such as a ball and socket joint 26, with the rear portion of the tractor, and the rear end of the upper link member 23 is connected with a ball and socket joint 27 with the upper end of the mast section 21 of the implement frame.

The forward member 24 of each of the lower link members 23 includes a sleeve which at its forward end is connected to a ball and socket joint 28 with an adjacent portion of the tractor, such as the drawbar support frame 29 of the tractor. Each of the sleeves 24 is hollow and slidably receives the forward portion of the associated rear link part 25. Preferably, the forward end of the link part 25 carries a head 30 securely fixed thereto. The inner end 31 of the tubular portion serves as a forward stop for the forward end of the rear link part 25, and a shoulder 32 in the tubular section of the sleeve 24, and formed therein by any suitable means, serves as a rear stop for the head 30. The rear end of each of the link parts 25 is connected by a ball and socket joint 33 with the implement frame 18. Each of the sleeves 24 is connected with the associated lift arm 14 by a generally vertically extending link 35.

The operation of this form of the invention is substantially as follows. When the plow is working in the ground, the parts take the position shown in full lines in Figure 1. The parts 24 and 25 of the lower links 22 serve to transmit draft between the plow and the tractor, and consequently the effect of the force transmitted by the members 22 serves to hold the heads 30 of the rear link parts 25 against the shoulders 32. The implement is prevented from overturning forwardly by the upper link 23, which acts in compression. When it is desired to transport the implement from place to place, as from one field to another or the like, the tractor power lift mechanism 11 is actuated to rock the shaft 12 in a direction to raise the plow out of the ground, the plow and associated parts being then supported entirely by the tractor at the rear thereof in overhanging relation. As will be seen in dotted lines in Figure 1, when the plow is raised the lower links 22 extend downwardly and forwardly from the implement, and therefore the weight of the implement automatically causes the parts 24 and 25 to telescope or retract, the parts 25 moving forwardly relative to the tubular portions of the forward parts 24 until the front ends of the parts 25 engage the inner ends or bottoms of the tubular portions of the members 24. This has the effect of causing the plow, when raised, to move quite close to the tractor, thereby reducing the moment arm of the weight of the implement when the latter is supported entirely on the tractor. It will be noted that this action takes place automatically as a consequence of the raising of the implement into its transport position. Broadly, therefore, the present invention contemplates the provision of means responsive to the raising of the implement into a transport position for automatically shifting the implement forwardly into close-coupled relation with respect to the rear end of the tractor, whereby relatively heavy implements, such as a multi-bottom plow, may be supported for transport without removing too much weight from the front end of the tractor.

In the hitch mechanism described above, the lower links telescope into retracted relation whenever the implement is raised. It this form of the invention, the upper link is arranged to swing upwardly and forwardly so that, when the implement is raised, the upper end of the mast section, and the implement frame, also moves forwardly by virtue of the upward and forward displacement at the point of connection 27 between the upper link 23 and the implement. In some cases, however, it may be desirable to have a greater displacement of the upper portion of the implement mast section than would be secured by a swinging link of fixed length, particularly where it is not necessary to raise the implement through the distance as shown in Figure 1, as in the case of a disk harrow, for example. Accordingly, in the form of the invention now to be described, the upper link may also be made telescoping so that, with suitable control means, when the implement is raised, the latter is shifted forwardly by virtue of telescoping action of both the upper as well as the lower link connections.

Figure 2:
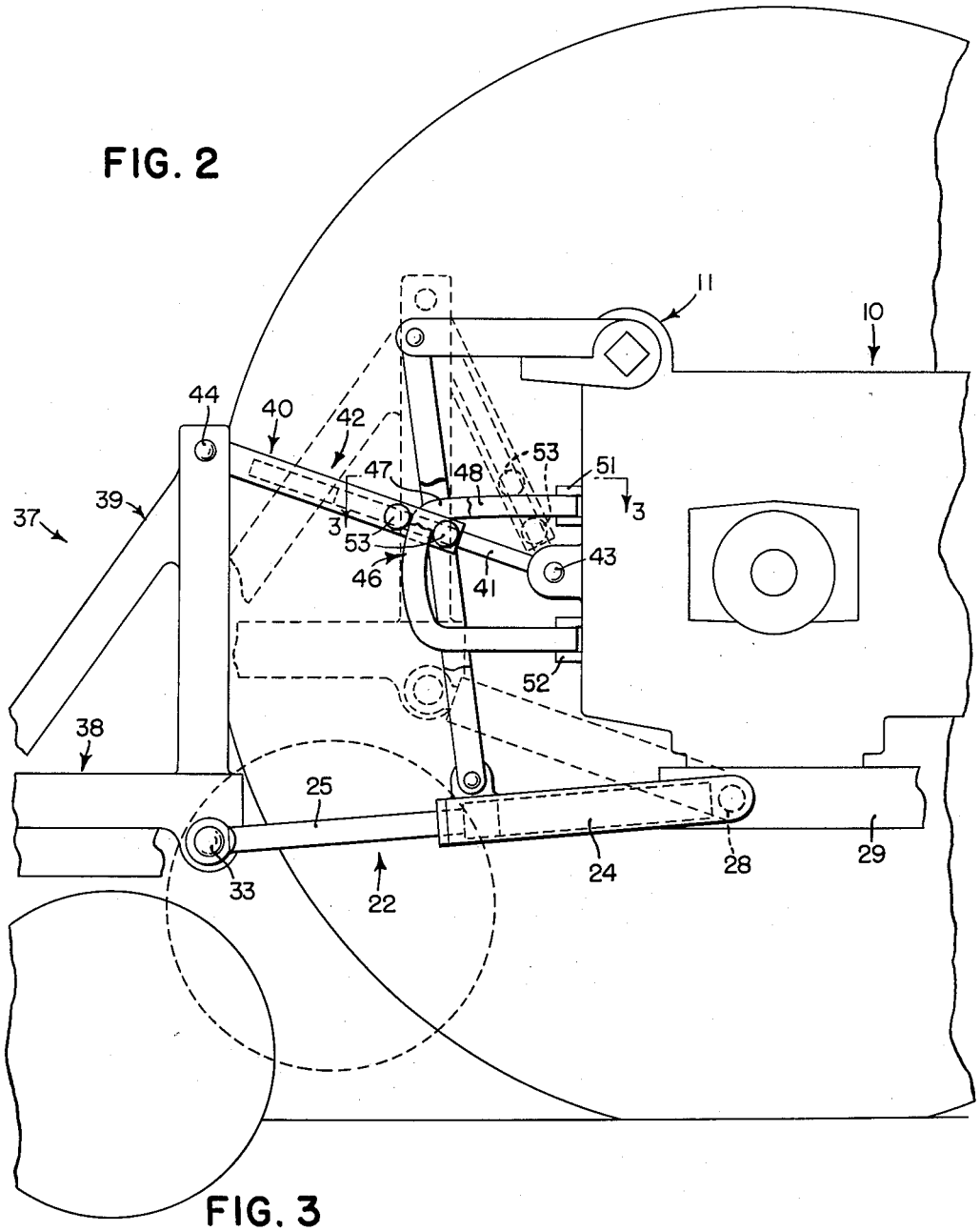
Figure 2 is a view similar to Figure 1, showing a modified form of construction.
Figure 3:
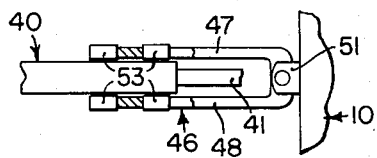
Figure 3 is a fragmentary view taken along the plane of the line 3—3 of Figure 2.

Referring now to Figure 2, the hitch device shown in this figure is substantially the same as that described above, so far as the lower links are concerned. As illustrated, the hitch device of Figure 2 serves to connect a disk harrow 37, having a frame 38 with a forward mast section 39, to the tratcor 10. In this form of the invention, the upper link, which is indicated in its entirety the reference numeral 40 comprises a pair of telescoping parts 41 and 42. The part 41 is connected by a ball and socket joint or the like, as at 43, with the adjacent portion of the tractor and the rear part 42 is generally tubular in formation and receives the rear portion of the link 41. The tubular member 42 is connected at its rear end by a ball and socket joint 44 with the upper end of the mast section 39. A cam member 46, comprising a pair of interconnected generally U-shaped parts 47 and 48 is hingedly connected, as at 51 and 52, with the tractor at points generally above and below the ball and socket joint 43, the cam sections 47 and 48 being disposed on opposite sides of the link member 40. The rear link part 42 carries roller means 53 engaging the cam member 46. The latter is so formed that in normal operating position, as shown in full lines in Figure 2, the cam is formed generally circular or arcuate about the pivot of the ball and socket joint 43, but when the tractor power lift is operated to raise the implement, the roller means 53 engages a portion of the cam member 46 that extends generally forwardly, which causes the cam parts 47 and 48 to telescope and thereby shortens the effective length of the upper link 40. In this way, in addition to the forward displacements secured by virtue of the upward and forward swinging of the upper link member, the upper portion of the implement frame is also caused to move toward the tractor when the implement is raised, thereby securing an amount of forward movement of the implement somewhat greater than the amount that would be secured by virtue of the construction shown in Figure 1 with only the amount of elevation shown in Figure 2. In addition, the implement 37 is held substantially level in its transport position. In view of the fact that the remaining parts of the hitch construction as shown in Figure 2 are substantially identical with the corresponding parts shown in Figure 1, a further description of the operation of the hitch device as shown in Figure 2 is believed to be unnecessary.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A hitch device for connecting an earth-working implement to a tractor, comprising a vertically extending hitch structure on the forward portion of said implement, draft-transmitting means including lower link means and an upper link means, means for swingably connecting said link means for generally vertical swinging movement with the upper and lower portions of said vertically extending structure and the tractor, said lower link means including a pair of laterally spaced apart link members and each of said members comprises two telescopically associated parts, one part being connected with the implement and the other part being connected with the tractor, means connected with the tractor-connected link parts for raising and lowering the implement, and means limiting the extending movement of said link parts, said parts being retractable when the implement is raised, whereby raising of the implement serves to move the implement closer to the tractor.

2. A hitch device for connecting an earth-working impelment to a tractor, comprising draft-transmitting means including pairs of telescoping link members having limited relative movement in a generally fore-and-after direction and connected between the forward end of the implement and the rear portion of the tractor, said link member being freely movable in a generally fore-and-aft direction and being completely extended whenever the implement is in an earth-working position, means connected with said draft-transmitting means for raising the latter and the implement connected thereto into a position in which said draft-transmitting means extend downwardly and forwardly, whereby the weight of the implement, when raised, serves to telescope said link means and permits the implement to move to a position closely adjacent the rear end of the tractor, an upper link means adapted to connect the upper portion of the implement with the tractor, said upper link means also including a pair of telescopically associated parts adapted to move into telescoped relation when the implement is raised, thereby providing for a close coupled relation between the implement and the tractor when the implement is raised, and means carried by the tractor and engageable with the rear of said telescopically associated parts for holding the latter against telescopic movement until the upper link means has been raised to a predetermined position.

3. A hitch device for connecting an earth-working implement to a tractor, comprising draft-transmitting means including a pair of telescopically associated link members, means for connecting the forward member with the tractor and the rear member with the implement, upper thrust-transmitting link means including a pair of telescopically associated link members, and cam track means adapted to be supported on the tractor and acting against the rear member of said upper link means for controlling the telescoping action of said upper link members.

4. A hitch device for connecting an earth-working implement to a tractor, comprising a pair of laterally spaced apart lower draft-transmitting link means, means connecting the forward end of said link means with the tractor and the rear ends of said link means with the implement, an upper link means comprising a pair of telescopically associated generally for and aft extending parts, there being a forward part and a rear part, means connecting the forward end of the forward part with the tractor and the rear end of the rear part with the implement above said lower draft-transmitting link means, a cam member, hinge means connected with said cam member for connecting the latter to the tractor for generally lateral movement relative thereto about a vertical axis, and means carried by the rear part of said telescopically associated parts for controlling the telescoping action of said parts.

5. The invention set forth in claim 4, further characterized by means for raising said link means and the implement associated therewith, and said cam means being so formed and shaped that, when the implement is raised, the rear part of said upper link means moves forwardly relative to the tractor.

(References on following page)

References Cited in the file of this patent

UNITED STATES PATENTS

| | | |
|---|---|---|
| 1,864,639 | Crezee | June 28, 1932 |
| 2,346,757 | Horner | Apr. 18, 1944 |
| 2,410,508 | Lamme | Nov. 5, 1946 |
| 2,457,163 | Lansing | Dec. 28, 1948 |
| 2,557,637 | Danuser | June 19, 1951 |
| 2,575,429 | Rogers et al. | Nov. 20, 1951 |
| 2,577,002 | Corl et al. | Dec. 4, 1951 |
| 2,604,708 | Washbond | July 29, 1952 |
| 2,624,551 | Garner | Jan. 6, 1953 |
| 2,674,170 | Morkoski | Apr. 6, 1954 |

FOREIGN PATENTS

| | | |
|---|---|---|
| 599,020 | Great Britain | Mar. 3, 1948 |